Jan. 1, 1935. R. HEAD 1,986,265
TRANSMISSION FOR AUTOMOBILES AND THE LIKE
Filed July 2, 1931 4 Sheets-Sheet 2
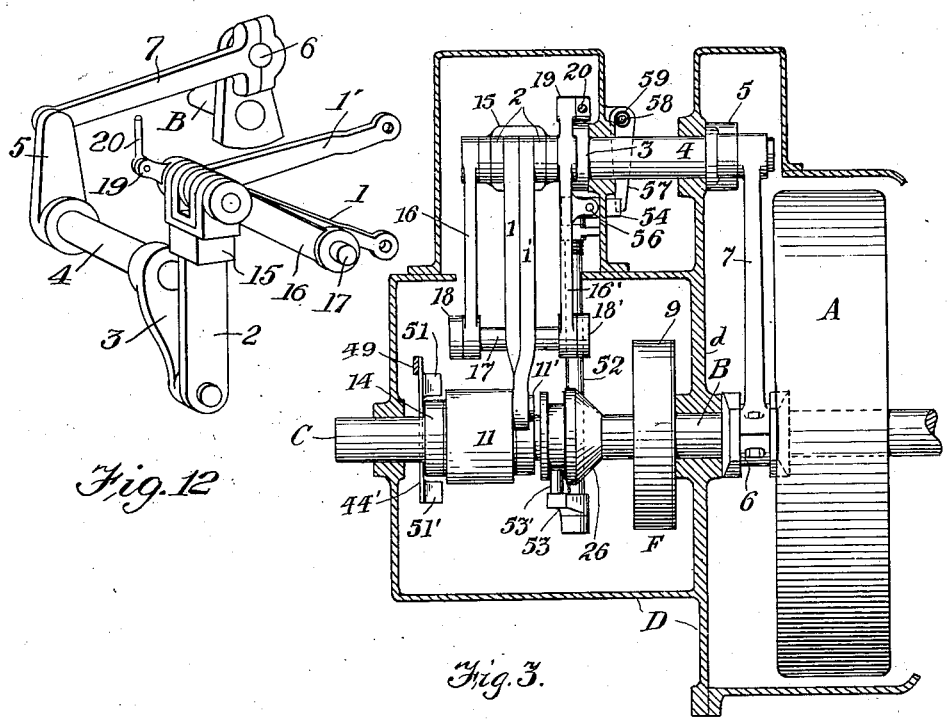
Fig. 12
Fig. 3.
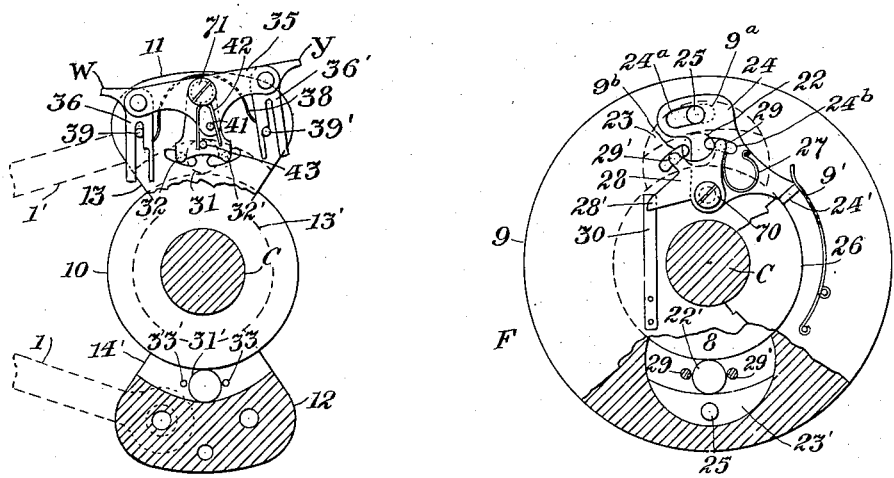
Fig. 4.
Fig. 5.
INVENTOR
Robert Head
BY
ATTORNEY Jan. 1, 1935.  R. HEAD  1,986,265
TRANSMISSION FOR AUTOMOBILES AND THE LIKE
Filed July 2, 1931  4 Sheets-Sheet 3

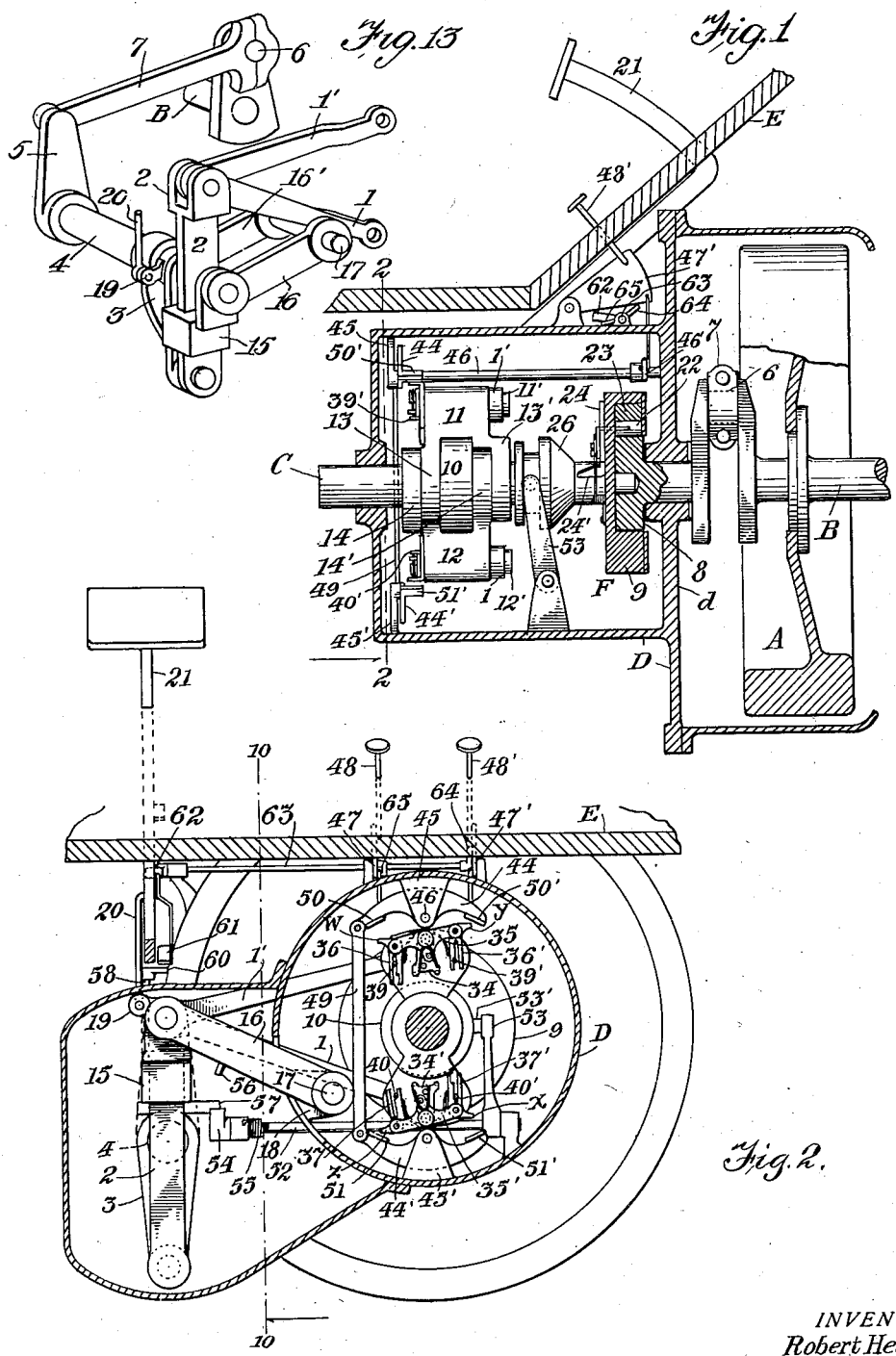

INVENTOR
Robert Head
BY
Ed Scherr Jr
ATTORNEY

Jan. 1, 1935.  R. HEAD  1,986,265
TRANSMISSION FOR AUTOMOBILES AND THE LIKE
Filed July 2, 1931  4 Sheets-Sheet 4

INVENTOR
Robert Head
BY
ATTORNEY

Patented Jan. 1, 1935

1,986,265

UNITED STATES PATENT OFFICE 1,986,265

TRANSMISSION FOR AUTOMOBILES AND THE LIKE

Robert Head, Yonkers, N. Y.

Application July 2, 1931, Serial No. 548,305

8 Claims. (Cl. 74—119)

My present invention relates to improvements in automobiles. One of its objects is to provide a transmission unit free from shifting gears; also to provide a transmission unit capable of transmitting the engine power to the drive wheels, at any desired ratio of speed, from zero to the full speed of the engine. The transmission unit hereinafter described will permit "coasting" without "forcing" the engine and further it dispenses with the usual friction clutch.

A further object of my invention is to provide means for gradually imposing the load on the engine while it is running at full speed and therefore developing its full power, as opposed to the present method of retarding the engine speed, at a loss of power, to increase the gear ratio or leverage, which may be accomplished by means of the devices of this invention, without disconnecting the power unit.

Another object is to provide means that will prevent back rolling of a car when stopped on an incline, without the usual application of brakes, also to prevent "back kick" of the engine while being cranked.

Other objects will appear from the following description.

The purposes of my invention may be attained in the manner described in these specifications and accompanying drawings which illustrate by way of example without there being any intention of limiting the invention to the details of the specific devices shown and described except as required by the claims.

Figure 6:
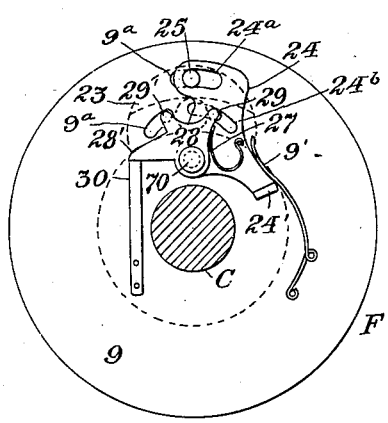
Figure 7:
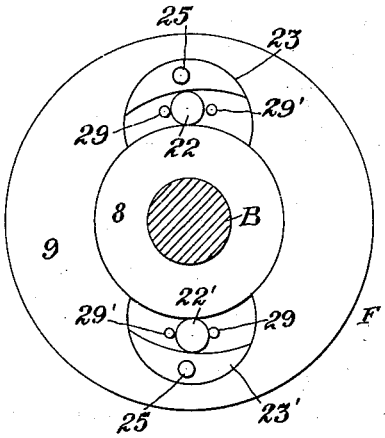
Figure 8:
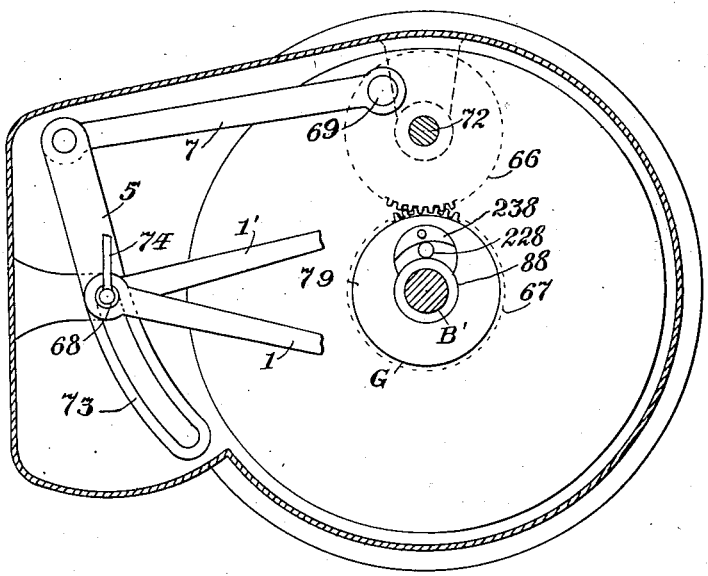
Figures 10, 11:
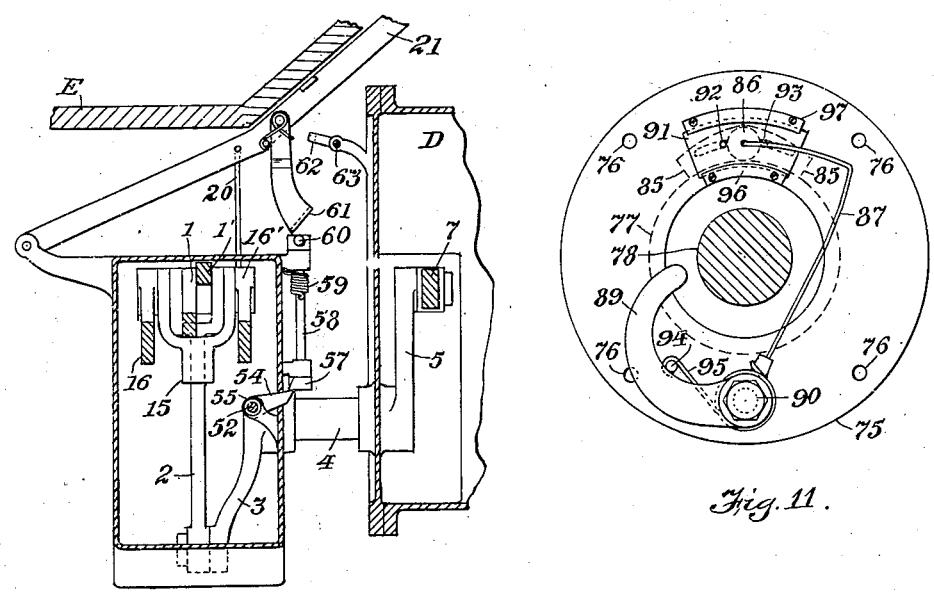
Figure 9:
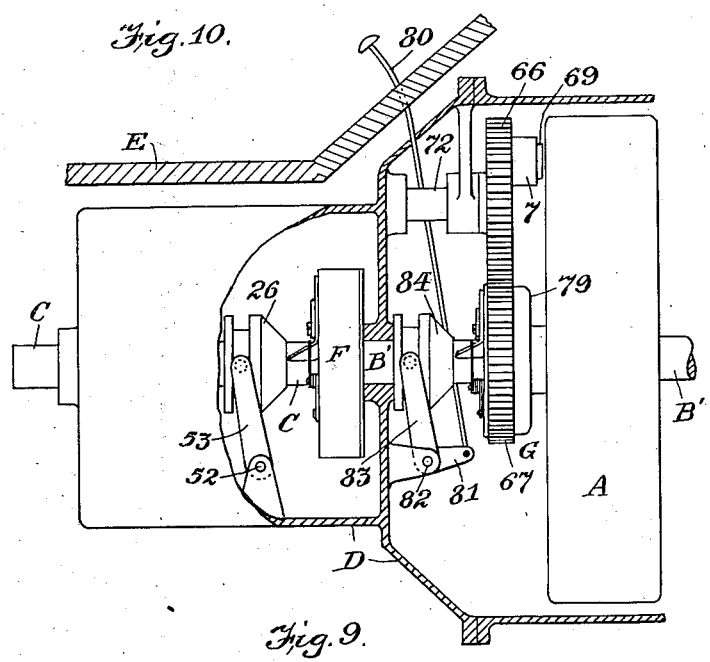

Fig. 1 is a longitudinal section through the fly wheel and transmission housing, showing the transmission unit in elevation and partly in section; Fig. 2 is a cross section through the housing on the line 2—2 in Fig. 1, and shows an end view of the transmission unit; Fig. 3 is a sectional view in an approximately horizontal plane; Fig. 4 is an enlarged view of the variable speed clutch device shown in Fig. 2; Fig. 5 is an enlarged view of the releasable over-running clutch designated F in Figs. 1 and 3; this view is a cross-section of the driven shaft C and an elevation of the back of the drum 9 with a portion thereof broken away to reveal inner structures; Fig. 6 is an analogous view showing the control devices in an inoperative or declutched position; Fig. 7 shows a clutch of the same type with additional means to prevent over-riding; Fig. 8 is a modification of the variable speed mechanism, and is a similar view and on the same scale as that shown in Fig. 2; Fig. 9 is a longitudinal section through the fly-wheel housing and part of the transmission housing showing in elevation the clutching device for the modified, variable speed mechanism; Fig. 10 is a vertical section taken on line 10—10 in Fig. 2, showing in elevation the locking and tripping device for controlling the clutch F; and Fig. 11 is a clutch of modified form in further illustration of the principles of those shown in Figs. 4, 5 and 7. Fig. 12 is a perspective view on a larger scale of the parts bearing the same numerals in the previous figures; and Fig. 13 is the same as Fig. 12 except it shows some of the parts in other positions of adjustment.

The transmission unit consists of a crank shaft B coupled direct to the engine shaft through the fly wheel A and terminates in a disk 8. A drum or shell 9 is rigidly secured to the driven shaft C which is journaled in the disc 8. The shaft C is also provided with a disc 10 keyed thereto, and two sector blocks 11 and 12, each with two extensions or ears 13—13' and 14—14' having aligned holes through which the shaft C freely passes so that the blocks are journaled on said shaft. Journaled on the crank pin 6 is one end of the connecting rod 7, the opposite end being secured to the free end of crank 5 which in turn is keyed to the end of a rocker shaft 4, the latter being suitably journaled in the housing D.

At the opposite end of the rocker shaft 4, another crank 3 is keyed diametrically opposed to crank 5. The lower end of a lever 2 is secured to the free end of crank 3, and the upper end which is bifurcated is connected to one end of each of the links 1—1'; the other ends of 1—1' engage the studs 11'—12' on the sectors 11—12, Figs. 1 and 3.

A sleeve member 15 adapted to slide along the lever 2 is trunnioned between the free ends of a frame consisting of two arm members 16—16' keyed to a cross bar 17 journaled in stationary bearings 18—18' suitably supported from the housing. The free end of arm 16' terminates in a lug 19 to which is connected a link 20 which also connects with the foot-pedal lever 21, Figs. 2 and 3.

Combined with the disc 8 and drum 9 is a roller 22 and a crescent-shaped block 23 together forming an over-riding clutch F (Figs. 1, 5 and 6) for the purpose of driving a shaft C at engine speed or allowing it to over-run the shaft B, when it exceeds the engine speed. The crescent-shaped block 23 is seated in a circular-outlined recess in the back of the drum 9 and has a stud 25 projecting through a short slot 9ᵃ through the back of the drum which limits the movement of 23 and also supports it against this circular wall of its recess. The block 23 has a convex outer edge corresponding to the outline of the recess in the drum and has a concave inner edge facing the periphery of the disc 8 of the driving shaft B. Between the latter surfaces is located the roller 22.

While one roller 22 and block 23 make a satisfactory clutch, they are shown in duplicate in Figs. 5 and 7, the duplicates being designated 22' and 23'.

For the purpose of changing the position of the crescent block 23 so that its concave surface may be positioned either concentric or eccentric with the periphery of the disc 8; a detent 24 is pivoted to a stud 70 on the back of the drum 9 as shown in Figs. 5 and 6. A slot 24$^a$ in the free end of the detent 24 engages the stud 25 extending from the block 23 through the slot 9$^a$ in the back of the drum 9. The detent has a lug 24' (Figs. 1, 5 and 6) placed in the path of a conical member or so-called "retractor" 26 and is adapted to ride upon the inclined surface thereof, the conical "retractor" being slidable laterally (Figs. 1 and 3) along the driven shaft C.

With the lug 24' at the largest diameter or base of the retractor 26 (see Fig. 5), the end of the slot 24$^a$ in 24 will force the stud 25 to the extreme left of the slot 9$^a$ in the drum-back 9 and thereby lock the block 23 in its eccentric position relatively to the disc 8. The roller 22 will be yieldingly pressed into the wedge-shaped space formed by the concave surface of 23 and the periphery of the disc 8 by a light bow spring 27 anchored to 24 and bearing against a member 28 pivoted on the stud 70. This member 28 is formed with two prongs 29—29' extending through slots 24$^b$ and 9$^b$ respectively in 24 and 9 and contact with the roller 22 on either side.

To prevent the roller 22 from entering the aforesaid tapering space before the block 23 is locked in position, the member 28 is held against the action of the bow spring 27 by its toe 28' until the lug 24' is at the base of the retractor 26, when a further lateral movement of 26 will press and disengage 30 from 28' and thereby release 28. The bow spring 27 will then actuate 28 to press its prong 29 against the roller 22, forcing it into the converging space, thereby locking the disc 8 and the drum 9 when shaft B is revolving anti-clockwise and at a higher speed than shaft C and resulting in driving shaft C at the speed of the engine shaft B.

The detent 24 is returned to its initial position (Fig. 6) by the spring 9' when the tractor 26 is moved away from 9. The detent thereby returns the crescent member 23 into its concentric position and returns 28 into the position shown in Fig. 6 locked by the spring 30 and with the roller 22 carried into its free, unwedged position.

For the purpose of driving the shaft C at variable speeds less than that of the engine, I provide the previously described disc 10 keyed to the shaft C and the rollers 31—31' to grip it alternately and drive it as the sectors 11—12 are oscillated through arcs of greater or less length by the variable reciprocating motion of the previously described links 1—1'. The rotation thereby given the shaft C is virtually continuous as one of the rollers will rotate the shaft while the other roller is idling.

The pockets formed by the inner surface of the sectors 11 and 12, and the periphery of the disc 10 are widest at the centre and taper towards either end as shown in Fig. 4. The rollers 31—31' are straddled and yieldingly pressed to the right or left by the prongs 32—32' and 33—33' projecting from the plates 34—34' through slots in the ears 13 and 14, (Figs. 2 and 4) of the sectors 11 and 12. The plates 34—34' are pivotally mounted on the sectors 11 and 12 by the screw studs 71. Double ended levers 35—35' are mounted on the same screw studs 71 with the plates 34—34' and have pivoted at their ends the latch members 36—36' and 37—37' having lugs W, X, Y and Z.

Each of these latch members has a notched slot adapted to engage the pins 39—39' and 40—40' projecting from the sectors 11 and 12 and they are pressed outwardly by the springs 38 to hold them so engaged.

When pressure is applied at either end of the lever 35, its opposite end will move outwardly, carrying the associated latch member to a position where the notch will engage the pin and hold the lever in that position until released by pressure applied to the lug W or Y as the case may be, which will disengage the notches and pins.

A pin 41 in each tiltable lever 35—35' forms an abutment for one leg of a spring 42 and will yieldingly pull right or left against the pin 43 in plates 34—34' through the opposite leg of the spring 42 to shift said plates and their prongs as heretofore described so that the friction rollers 31—31' are pressed correspondingly into the wedge-shaped recesses.

As a convenient means for changing the position of the levers 35—35', two rocker-levers 44—44', with flanges 50—50' and 51—51', are so mounted in housing D that the flanges may be brought into contact with the lugs W, X, Y and Z.

The rocker-lever 44 is keyed to the rocker shaft 46 (Figs. 1 and 2) which is journaled in the bearing 45 and the wall plate $d$ of housing D (Fig. 1). The two ends of another lever 46' (Fig. 1) keyed at the center of the lever to rocker shaft 46, are connected by links to two bell-cranks 47—47' mounted on the outside of the housing D. Two plunger rods 48—48' extend through the floor boards E and connect with the bell-cranks. The levers 44—44' (Fig. 2) are linked together by rod 49, the lever 44' being pivoted at its centre to the bearing 45'.

A spring means, not shown, tends to return the levers 44—44' to a neutral position, as shown in Fig. 2.

A rocker shaft 52 (Figs. 2 and 3) is journaled in the lower part of the housing D and has at one end an upwardly extending lever 53 with a pin 53' extending from its free end and engaging the groove in the retractor 26 for shifting it along the shaft C as heretofore described. Another lever 54 is keyed to the shaft 52, at right angles to 53, and a coil spring 55 normally holds the retractor 26 away from the lug 24' of the detent 24.

The retractor 26 is brought in contact with this lug 24' and held there, whenever the pin 56 on the arm 16' is pressed down far enough to bear down upon the free end of the lever 54 and cause it to ride under the latch 57 and be locked by said latch (see Figs. 2 and 3).

This latch 57 is keyed at right angles to the lower end of a vertical rod 58, journaled to the housing D, said rod being provided with a coil spring 59 for yieldingly holding the latch 57 in the path of the lever 54.

A finger 60 (Fig. 2) projects laterally from the upper end of this rod 58 and lies in the downward path of a cam 61, mounted on the foot lever 21. At the start of the downward movement of the foot lever 21, the underside of the cam 61 co-acts with the finger 60 to turn the rod 58 to move the latch 57 out of the path of the lever 54, which releases the rocker shaft 52 to the action of the heretofore described spring 55 (Fig. 2) to operate the lever 53 and the retractor 26 into its inactive position shown in Fig. 1. On the return movement of the foot lever 21, the cam 61 (Fig. 2) idles past the finger 60.

Thus, it will be seen that the over-riding clutch F is rendered inoperative or declutched at the start of the downward movement of the foot pedal 21 and remains declutched until the end of the downward movement of the foot pedal, at which time the pin 56 contacts as aforesaid with the lever 54, pressing it into the locked position under the latch 57 and so locks and maintains the clutch F in its operative or clutched position as in Fig. 5 until the foot pedal has returned to its normal position and is again depressed.

In addition, the foot pedal 21, in its downward movement, lowers the frame members 16 and 16' (Fig. 2) and the related trunnioned sleeve 15 which, it will be recalled, forms a variable fulcrum for the lever 2 whereby the upper end of said lever 2 will have a variable stroke, starting from zero and increasing in length as the foot pedal descends.

When the foot pedal reaches the limit of its downward movement, the trunnions of the sleeve 15 will be at the centre of the lever 2 giving an equal travel or leverage at its extreme ends. The links 1—1' will then be moving at their highest speed for any constant engine speed, and will oscillate the sector blocks 11—12 through their greatest arc of travel and cause the shaft C to revolve at approximately the same speed as the driven shaft B. Conversely, the speed of shaft C will diminish and the leverage increase as the fulcrum 15 moves from the centre of 2 towards its upper end until finally, when the axis of the trunnion and knuckle joint of 1—1' and 2 coincide, no movement will be delivered to the sectors 11—12 and shaft C.

While the direction of rotation of the engine shaft B is always the same, that of the driven shaft C will change in accordance with the position of the lever bars 35—35'. In operating a car equipped with a transmission unit as herein described, the engine will be started in the usual way, and having determined, for example, to move the car in a forward direction, the operator will press down the foot plunger 48, which will, through the train of levers described, press the roller 31 into the right pocket of sector 11, and roller 31' into the left pocket of sector 12 (Fig. 4). The plunger 48 will then be released.

The car will be set in motion by pressing down the foot lever 21; and the speed of the car will be gradually accelerated in proportion as the foot pedal lowers the fulcrum sleeve 15 as herein explained. When the foot pedal has reached the limit of its downward travel, the clutch F will be driving the shaft C; and any further acceleration of speed will be gained in the usual way by manipulating the engine throttle.

In this manner the load is gradually imposed on the engine, and the car-speed uniformly increased by means of only one foot lever without a break in the power line at any time, as contrasted with the present method of gathering momentum by shifting gears, by hand, from "low" to "second" and so on to "high", losing momentum and power each time the engine is uncoupled from the transmission gears to make the shift.

All clutching and declutching and all speed ratio between the driving and driven shafts are controlled by the foot lever 21 which replaces the present clutch lever and the present hand lever for shifting gears, as well as the gears themselves.

If the car is to be stopped while ascending a grade, it is only necessary to press the foot pedal far enough to release the retractor 26 and then allow the foot pedal to return to its initial position. It will not be necessary to apply the usual service brake, as the car will not roll backward, the disc 10 being locked against a reverse motion by the wedging of the rollers 31—31' against the sectors 11—12, which are held stationary by the links 1—1'.

To reverse or back the car after it is brought to a standstill, the plunger 48' is pressed downward and through its train of levers the direction of pressure is changed against the rollers 31—31', forcing them into the other or opposite wedge-shaped pockets between the disc 10 and the sectors 11—12, then by pressing the foot lever 21 the driven shaft C will revolve in a direction opposite to that of shaft B.

However, in backing, the foot pedal 21 is prevented from completing its downward stroke by reason of the obstructing lug 62 (on rocker shaft 63) set in its path when the bell crank 47' of the "reverse" plunger 48' coacts with the arm 64 on rocker shaft 63 so that the pedal 21 cannot be lowered far enough to bring the retractor 26 into play to couple together the members of the clutch F and the shafts B and C. This obstructing lug or stop 62 is removed from the path of the foot lever, when the "forward" plunger 48 presses its bell crank 47 against the arm 65 on the rocker shaft 63.

With some of the "coasting" or so-called "free wheeling" devices now in use, the old arrangement of shifting gears has been retained in addition to another train of gears and an over-riding clutch and the usual friction clutch within the fly wheel, one object being to utilize the braking action of the engine when required to augment that of the service brake.

The same object may be attained by me by placing the crescent-blocks 23—23' in opposing positions as shown in Fig. 7, it being understood that the block 23' with its roller 22' will be controlled by separate means, similar to that already described for controlling block 23 but connected to impart the opposite position to the block 23' and roller 22' relatively to 23 and 22. It will be seen that any tendency the shaft C may have to run faster than and over-ride the shaft B will be overcome by the wedging of the roller 22' into the narrow part of its pocket, and this will bring into play the braking action of the engine.

It is obvious that the same effect may be had by rotating the block 23 to the right instead of to the left as shown in Fig. 5, which will reverse the wedging action of the roller 22 and cause shaft C to drive shaft B, thus "forcing the engine".

A modification of the devices of my invention is indicated in Figs. 8 and 9 which permits all parts of the described intermediate speed mechanism to be at rest when the shaft C is directly coupled to B. By this modification, the connecting rod 7 and the intermediate speed mechanism of Figs. 1, 2 and 3 are driven by a crank pin 69 on the side of a gear 66. This gear 66 is mounted on a spindle 72 within the fly wheel housing, and meshes with another gear 67 integral with the drum 79 which is freely mounted on the engine shaft B' and forms the driven member of the clutch G, the driving member being a disc within the drum 79, said disc being keyed to the engine shaft B' and being comparable with the disc 8 in the earlier figures.

The clutch G is essentially the same as clutch F and has a block and a roller like the block 23 and the roller 22 in Figs. 1, 5 and 6, and is controlled by a duplication of the parts 24, 28, 39 and 9' shown in Figs. 5 and 6 in the clutch F.

Clutching and declutching is accomplished by moving the rod 80 up to unclutch or down to clutch. When the rod 80 is pressed downward, it moves the levers 81 and 83, fulcrumed at 82, and the retractor 84, which slides on the shaft B', towards the clutch G and sets and locks the wedging parts in the same manner as retractor 26 associated with clutch F, previously described and shown.

While the rod 80, Fig. 9, may be operated independently of the foot pedal 21, (Fig. 2), it is more desirable to have it operate in conjunction with it through a system of levers that will cause G to clutch as the foot pedal starts its downward movement, and remain clutched until the foot pedal has nearly completed its upward movement, at which time the variable fulcrum 15 and its associated parts will be in their initial or neutral position. Upon completion of the upward movement of 21, the device G will be declutched.

As stated, the object of this modification is to permit all parts of the intermediate speed mechanism of Figs. 1, 2 and 3 to be at rest when the shaft C is directly coupled with and directly driven by the engine; whereas in the embodiment in Figs. 1 to 3, these parts are in motion even after the shaft has become directly coupled.

Moreover, a simplified form of a variable lever is shown also in Fig. 8, wherein a curved and slotted crank 73 connects with the knuckle joint of the links 1—1' and replaces the straight crank 3, lever 2, sleeve 15 and frame composed of members 16—16' and 17 heretofore described in connection with Figs. 1 to 3.

The ends of the links 1—1' may be lowered or raised by link 74 connected with the foot pedal 21, and the stroke 1—1' will be lengthened or shortened in accordance with the position of the pin 68 in the slot of the crank 73.

A further use for the clutch device of my present invention is its substitution in the present-day automobile construction for the friction clutch usually employed with the object of introducing the advantages of free wheeling. This is illustrated in Fig. 11 wherein the drum 75 is the driving member and is provided with holes 76 for the purpose of bolting it to the web of the engine fly wheel. The driven member 77 is keyed to the end of a shaft 78, on the opposite end of which will be the usual clutch gear.

A pocket 85 tapering towards its two ends is formed in the drum 75 and is adapted to wedge the roller 86 against the periphery of the disc 77 whenever the roller is moved away from the centre of the pocket. A plate 91, held in place by guide rails 96, 97, is provided with prongs 92—93 extending into the pocket 85 on either side of the roller 86 and is yieldingly pressed to the right or left by the flexible member 87, one end of which is pivoted to the centre of the plate 91, the other end being secured to the curved lever 89, which in turn is pivoted on the stud 90 and yieldingly held against the stop pin 94 by the coiled spring 95.

Normally, the roller 86 is yieldingly pressed into the right hand wedging space, this being the clutched or driving position, also the position for coasting without "forcing" the engine.

To release the clutch, the free end of the lever 89 is pressed away from the shaft 78 causing the flexible member 87 to yieldingly press the plate 91 and the roller 86 to the left. In this position, there will be no clutching action from the driving member 75. If, however, the speed of the disc 77 exceeds that of the drum 75, the roller 85 will become wedged and "force" the engine, and so bring into play the braking action thereof.

As a convenient means for operating the lever 89, a combination of parts may be employed, similar to that shown in Fig. 9, consisting of the push rod 80, levers 81, 83 and retractor 84, the inclined surface of which will engage the free end of the lever 89 when the retractor is moved forward along the shaft 78.

It will be understood that other modifications and changes may be made in the disclosed embodiments without departing from the scope and spirit of my invention, and I desire to include all such as a part hereof.

What I claim is:

1. In combination, a rotary power member; a rotary driven member; an adjustable part carried by one member with a space between it and the other member, said part being adjustable to make said space wedging; a rolling member supported in said space having a diameter adapting it to wedge therein when the space is wedging; means for operating said adjustable part and for positioning said rolling member; an oscillating part pivotally supported relatively to the axis of the driven member having a space between itself and the periphery of the driven member, said space converging from the middle of the oscillating part toward its ends; a rolling member in said space adapted to wedge in either end thereof; means under the control of the operator yieldingly forcing said rolling member toward either end of said space; means under the control of the operator for reciprocating the oscillating part deriving its power from the aforesaid rotary power member and being controllable to deliver any stroke to said part up to a maximum at which it rotates the driven part at a speed approaching that of the power member.

2. The combination defined in claim 1 further characterized by means which when the driven member is rotating at suitably high speed automatically operates the aforesaid adjustable part, being the third element in claim 1, into its wedging position and releases the rolling member into its wedging position, thereby directly coupling the rotary power member to the driven member.

3. In a transmission, the combination of a driving shaft and a driven shaft in axial alignment, a coupling means adapted to couple the driving and driven shafts in one direction of rotation, said means comprising a drumlike element fixed to the end of the driving shaft, having a surface of revolution; a disc fixed to the end of the driven shaft, having a working face complemental to said surface, an element adjustable to a wedging position housed within the drumlike member, a roller-like element adapted to being yieldingly forced into a wedged position between the working surface of said disc and the wedging element for the purpose of revolving the driven shaft at the same speed and in the same direction as the driving shaft but leaving the driven shaft free to revolve at a higher speed than the driving shaft and in the same direction, said coupling comprising another element, either fixed or adjustable at an opposing wedging position to the first mentioned wedging element and means for yieldingly directing a roller-like wedging element into either of the wedging spaces, comprising a plate freely mounted on the drumlike element, provided with two prongs extending within the wedging spaces impinging on either side of the roller; spring means between said plate and a second plate; slotted means in said second plate limiting the action of said spring, and connections between the second mentioned plate and the adjustable wedging element for operating the latter into and out of the wedging position; further spring means for yieldingly holding said plates in an inoperative position; a sliding element freely mounted on the driven shaft adapted to engage the second mentioned plate to move it into an operative position with respect to the wedging and roller elements; means for actuating the sliding element, consisting of a foot pedal and linkage connecting a rocker-bar and yoke engaging said sliding element; a variable speed over-running transmission device comprising a disc fixed to the driven shaft, oscillating members freely mounted on the driven shaft astride the disc, roller members adapted to wedge in either direction between the disc and oscillating members; means for yieldingly forcing the rollers into either wedging position consisting of plates freely mounted on the oscillating members, and terminating in prongs impinging on either side of the rollers; springs, and lever means for applying the tension of the springs to the pronged plates in either direction, said lever adapted to become locked in either position by means of detents; reciprocating rods operatively connecting with said oscillating members and a lever bar, one end of which is actuated by connection with the driving shaft; an adjustable fulcrum block slidably mounted on said lever bar, and thrust members connecting said fulcrum block to housing or frame; linkage connecting the fulcrum block and the foot lever substantially as described.

4. The combination defined in claim 3 further characterized by a cam member in operative relation with the foot lever control, a stud lying in the path of said cam movable in one direction by the cam surface at the initial movement of the foot lever, spring means to return said stud to its normal position after having been acted upon by the cam surface and further spring means to permit the cam to over-ride the stud in the reverse direction; a detent, a latch member on the rocker-bar operated through the action of said cam and stud to release the yoke member to the action of a spring adapted to move the sliding member on the driven shaft away from the over-riding clutch, releasing the control plate on same, to render the wedging element of the drum-like member inoperative; spring means for returning said foot pedal, together with the fulcrum block and thrust member to their normal or inoperative position; means associated with the adjustable fulcrum block adapted to contact with the latch of said rocker-bar and yoke, as the fulcrum block approaches the limit of its travel, to operate the sliding member on the driven shaft into engagement with the control plate of the over-running clutch, and again renders said clutch operative for rotating the driven shaft in the same direction as the driving shaft, the cycle of action during the forward and return movement of the foot lever being such that during the first period of its movement it automatically uncouples the driving and driven shafts in one direction of rotation, its further movement then brings into action the reciprocating means for accelerating the speed of the driven shaft and upon completing the first half of the cycle of action it automatically operates the controlled over-running clutch to couple the two shafts in one direction of rotation and then during the last half of the cycle of action it returns the reciprocating means to an inoperative position.

5. The combination defined in claim 3 further characterized by means to prevent the foot lever from operating the controlled over-running clutch into driving position when the driving and driven shafts are coupled through the variable speed means to revolve in opposite directions, said means comprising a stop block, a rocker-bar and the levers on the rocker-bar operatively connected with the reversing mechanism.

6. In a transmission, the combination of one or more clutching members freely mounted on an element to be driven, means for oscillating said members comprising the reciprocating members actuated by a driving member, means associated with the reciprocating members for varying their stroke from zero to the maximum length thereof, means carried by each of the clutch members for yieldingly holding a roller-like member into wedging engagement in either direction of rotation with the element to be driven; an over-riding clutch member between the driving and driven members, containing elements adjustable to opposing wedging positions; means for operating said adjustable wedging elements and for positioning a rolling member in the wedging space formed between the driving and driven parts of said clutch, after the wedging space has been established; a foot lever mounted on the housing of the transmission, provided with linkage whereby the forward movement of said foot lever will vary the stroke length of the reciprocating members proportional to the forward movement of the foot lever; further linkage connecting said foot lever and a sliding member on the driven shaft to co-act with control devices on the over-riding clutch as the foot lever approaches the limit of its travel thereby operating the wedging and roller elements to couple the driving and driven members; a latch and detent adapted to hold the sliding member in engagement with the control devices of the over-riding clutch against spring action, and cam means associated with the foot lever to contact with the detent to release the said sliding member permitting the wedging and roller members of the clutch to disengage at the initial forward movement of the foot lever, and spring means for returning the foot lever and the variable stroke means to their normal position.

7. The combination defined in claim 6 further characterized by control means for operating the reversing levers on the oscillating members, said control means comprising rocking members, the arms of which are adapted to be rocked into position to co-act with one of the detents on each of the oscillating members, the reversing lever and the yielding, roller holding means associated therewith for first releasing the pressure against the roller, then changing the direction of pressure against the roller, and then locking into position the roller holding means to maintain the pressure in the changed direction, and spring means to return the rocker members to their normal position, out of the path of the oscillating members.

8. The combination defined in claim 6 further characterized by a member comprising a stop block and linkage, automatically controlled by the said rocker means, to alternately obstruct and clear the path of travel of the foot pedal operating the means for varying the stroke of the reciprocating members and the control means associated with the over-riding clutch.

ROBERT HEAD.